July 2, 1968   R. F. WRENCH   3,390,661
APPARATUS FOR DECORATING GLASSWARE
Filed June 3, 1965   11 Sheets-Sheet 1

INVENTOR.
Robert F. Wrench
BY

ATTORNEY

INVENTOR
Robert F. Wrench
BY *[signature]*
ATTORNEY

July 2, 1968  R. F. WRENCH  3,390,661
APPARATUS FOR DECORATING GLASSWARE
Filed June 3, 1965  11 Sheets-Sheet 3

INVENTOR
Robert F. Wrench
BY
ATTORNEY

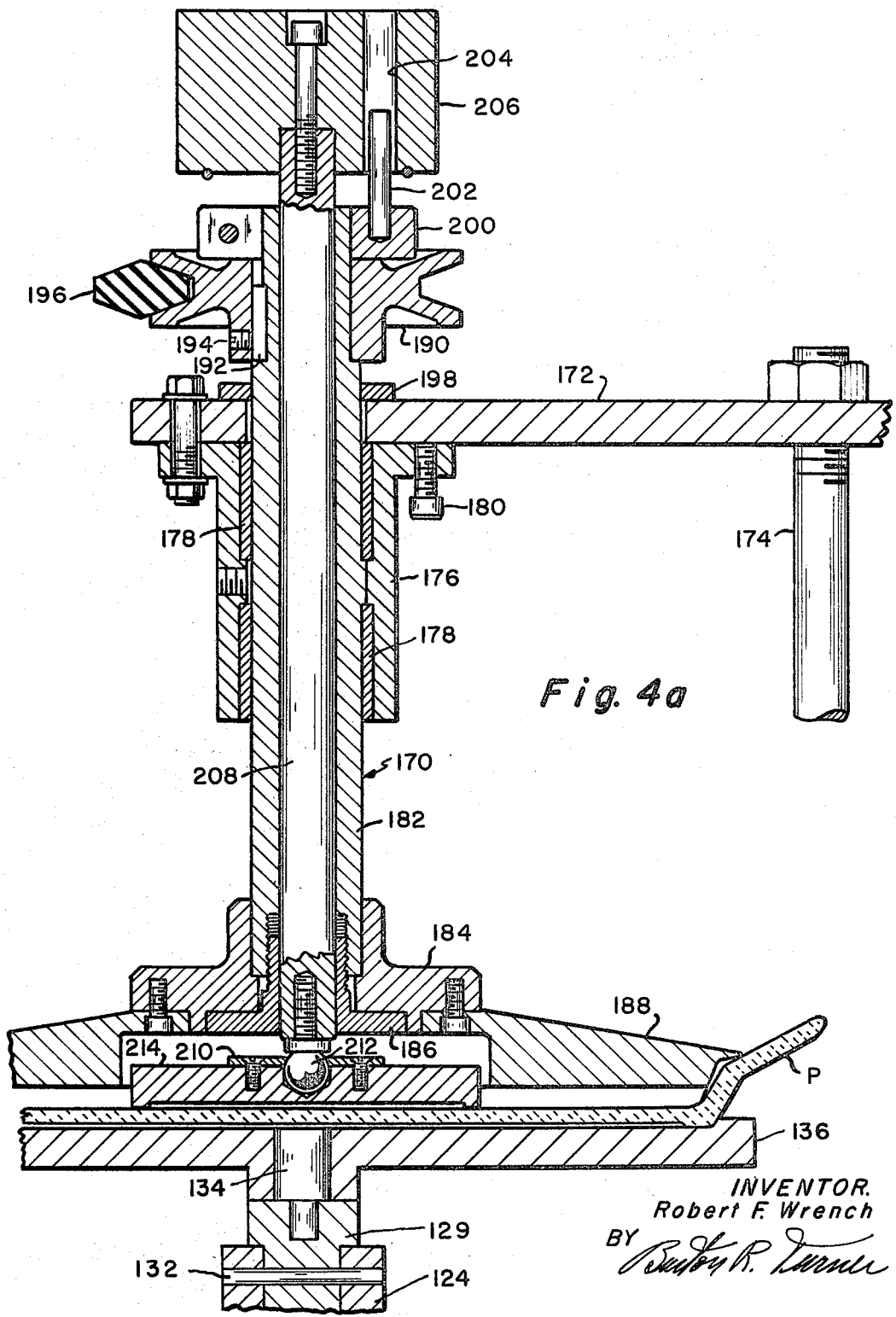

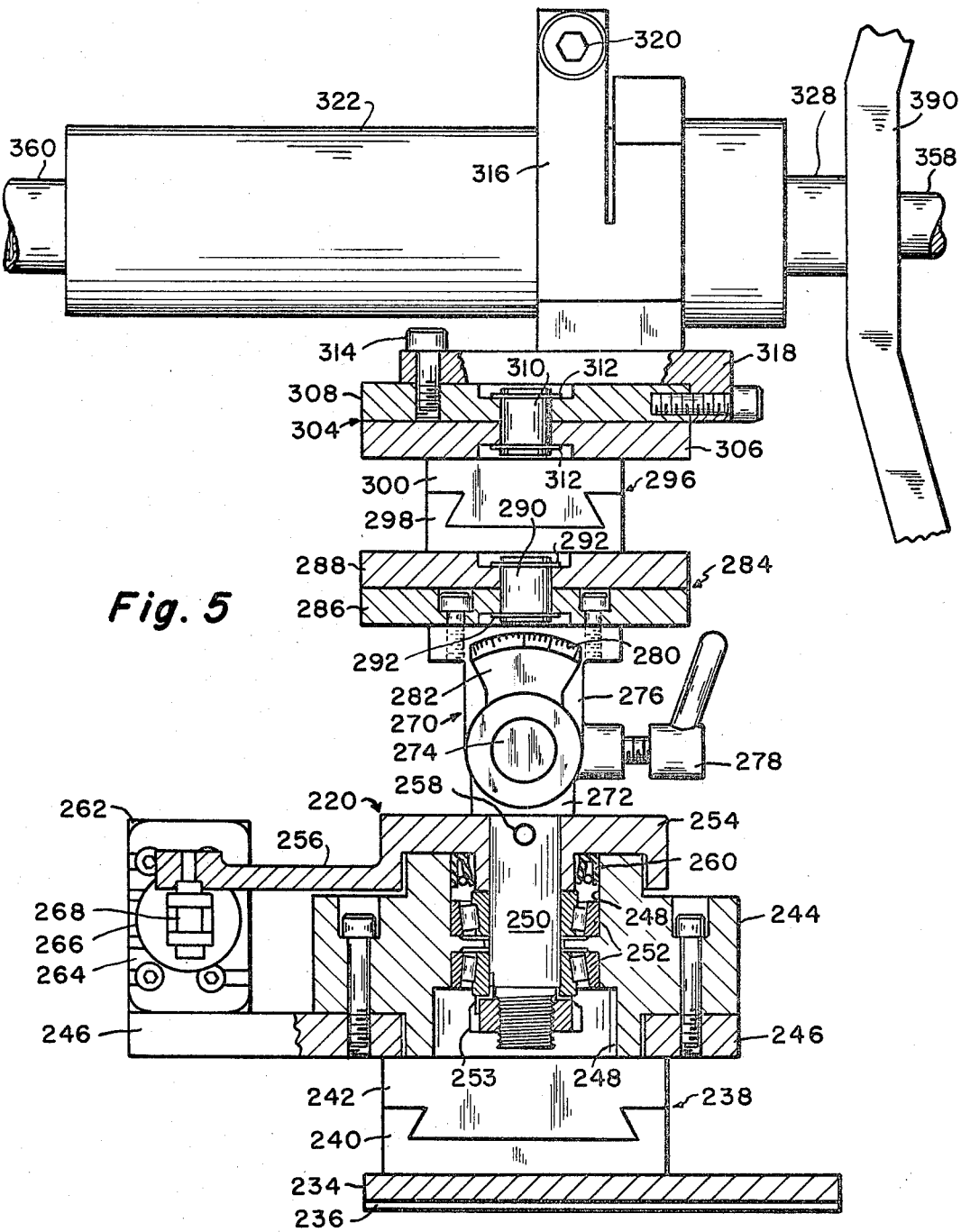

July 2, 1968

R. F. WRENCH 3,390,661

APPARATUS FOR DECORATING GLASSWARE

Filed June 3, 1965

INVENTOR
Robert F. Wrench
BY
ATTORNEY

INVENTOR.
Robert F. Wrench

July 2, 1968          R. F. WRENCH          3,390,661

APPARATUS FOR DECORATING GLASSWARE

Filed June 3, 1965          11 Sheets-Sheet 8

INVENTOR.
Robert F. Wrench

BY

ATTORNEY

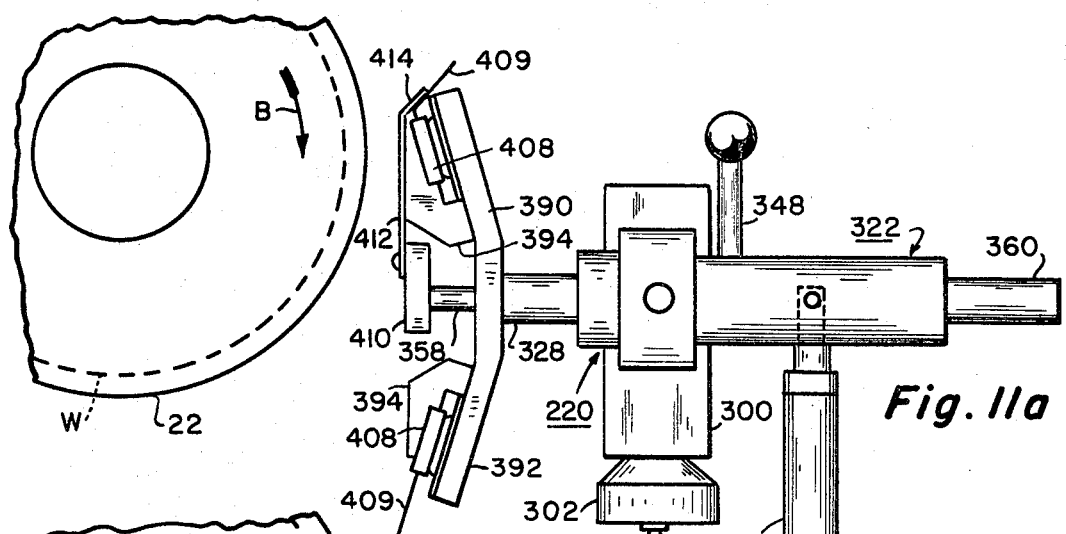
Fig. IIa
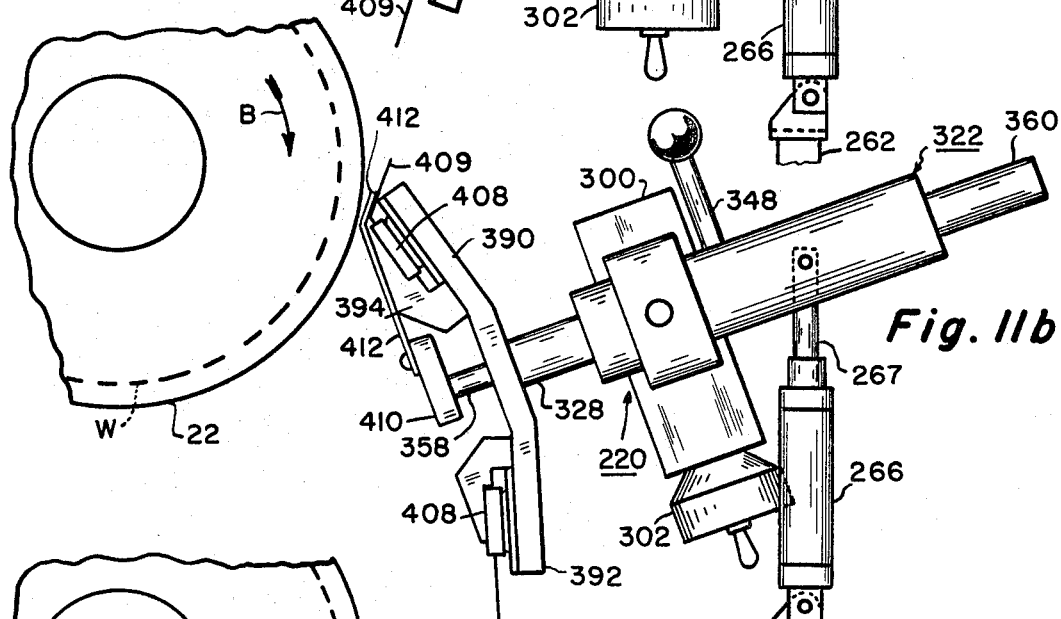
Fig. IIb
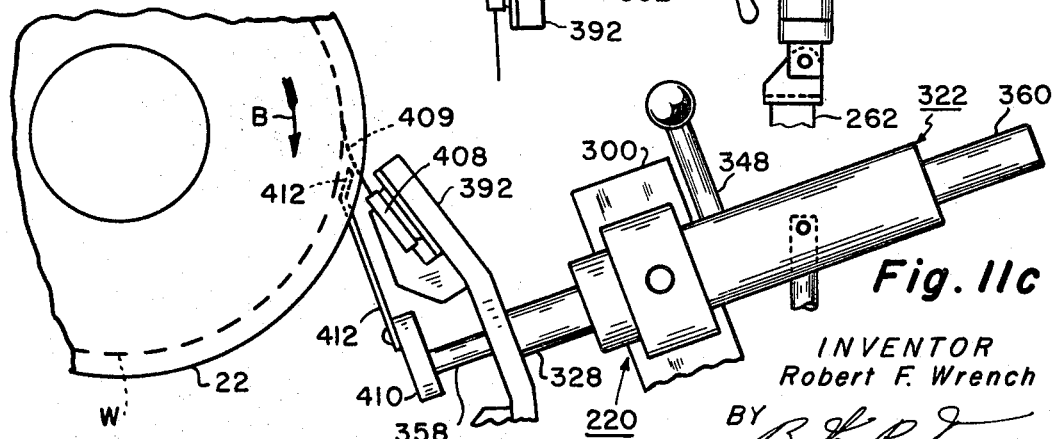
Fig. IIc
INVENTOR
Robert F. Wrench
BY
ATTORNEY INVENTOR
Robert F. Wrench
ATTORNEY

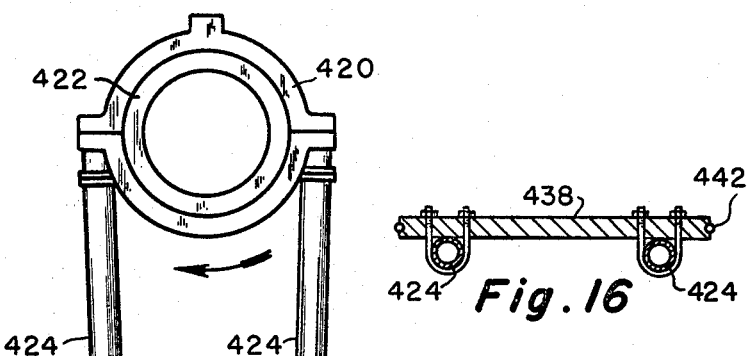
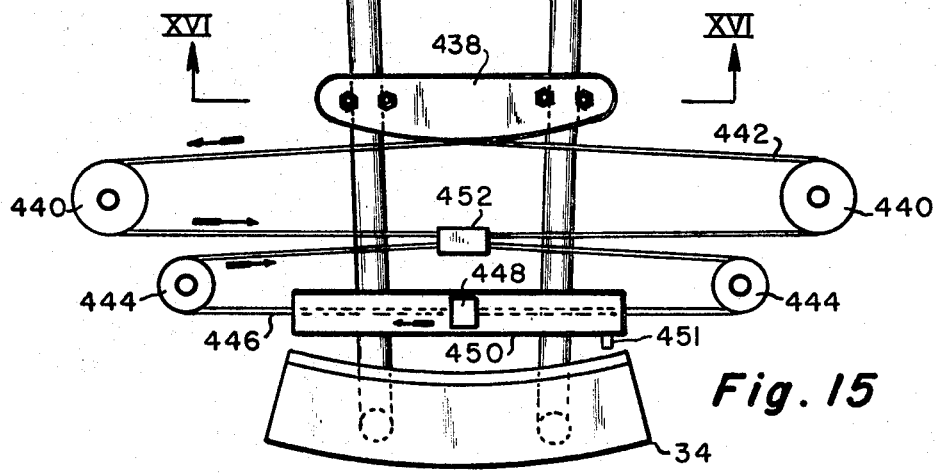
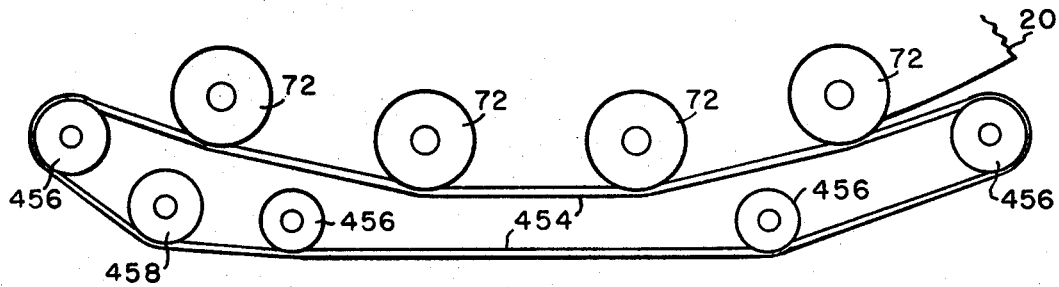
INVENTOR.
Robert F. Wrench
ATTORNEY

United States Patent Office 3,390,661
Patented July 2, 1968

3,390,661
APPARATUS FOR DECORATING GLASSWARE
Robert F. Wrench, Corning, N.Y., assignor to Corning Glass Works, Corning, N.Y., a corporation of New York
Filed June 3, 1965, Ser. No. 461,046
7 Claims. (Cl. 118—58)

ABSTRACT OF THE DISCLOSURE

A rotating table having a plurality of ware-retaining rotating spindle means adjacent its periphery for moving a plurality of ware articles through an arcuate path, wherein means are provided adjacent such arcuate path for applying a coating to the ware articles, drying such coating, and selectively removing portions of the dried coating.

---

In the past it has been known to decorate earthenware with a textured appearance by hand tooling the ware with a sharp cutting tool, while in an unbraked or moist condition. The ware is then usually fired and provided with selective painting so as to produce a multi-tone finished earthenware article.

This process has the obvious limitation, of course, of being limited to earthenware, since the texturing must be accomplished while the ware is in a "green" or soft state. That is, such process could not be adapted to glassware or glass ceramic ware which has no "green" state, but rather passes from a molten fluid into a frangible rigid article. The attempted tooling of a glass article by the method utilized in "green" earthenware, would abrade the article to such an extent so as to result in the total destruction of such article, or render it completely useless by forming a plurality of potential failure points on the surface thereof. Accordingly, in the case of glassware, it became necessary to first provide an additional coating to the glassware and then remove a portion thereof to provide a textured finish.

According to the invention, a table continuously rotatable about a vertical axis is provided with a plurality of ware-retaining spindles. The spindles are each separately rotatable about their own vertical axis and means are provided for maintaining the ware article on the upper end thereof. As ware positioned upon the spindles proceeds about the continuously rotating table, a plurality of spray nozzles apply a spray coating to the ware as the ware is rotated about the axis of the spindle. A suction chamber is preferably provided to remove excess paint and spray from the spraying area.

The rotating table moves the coated ware through an arc provided with a drying chamber or tunnel to dry the spray coating to powder form. The ware articles are then carried by the rotating table to a removal station where the articles are rotated about the axis of the rotating spindles and selective portions of the dried coating removed. It is thus possible to obtain a sharply defined textured design which distinguishes from the rounded or blended design which would result from either a molded product or wet formed product such as earthenware. The ware is then removed from the spindles which proceed onto a cleaning station before receiving a new ware article for processing. Preferably, the textured coated ware article removed from the spindle is then transferred to a lehr and fired to maturity.

It thus has been an object of this invention to provide novel apparatus for continuously reproducing a predetermined textured craftsman's design on formed glassware.

A further object of the invention has been to provide an apparatus for continuously decorating selected surface portions of glass articles through a plurality of sequentially performed operations.

A further object of the invention has been to provide apparatus for automatically decorating glass articles positioned upon a continuously moving conveyor including means sequentially acting upon such ware to apply a coating thereon, dry such coating, and selectively remove portions of the dried coating to produce a textured appearance of craftsman-like quality.

These and other objects of the invention will become apparent to those skilled in the art from the following disclosure and accompanying drawings in which:

FIGURE 4 is a side elevational view of a modified spindle assembly utilized for retaining plates and the like.

FIGURE 4a is an elevational view in section of a hold-down mask assembly utilized with the modified spindle assembly of FIGURE 4, so as to hold a plate in position upon such spindle assembly and mask the center portion thereof during the coating operation.

FIGURE 5 is a side elevational view partially in section of an adjustable tool pedestal assembly which is mounted on the movable tool carriage.

FIGURES 11a, 11b, and 11c illustrate the sequential steps of applying a cutting tool to the side of a coated ware article for selectively removing portions of such coating.

Figures 12, 13:
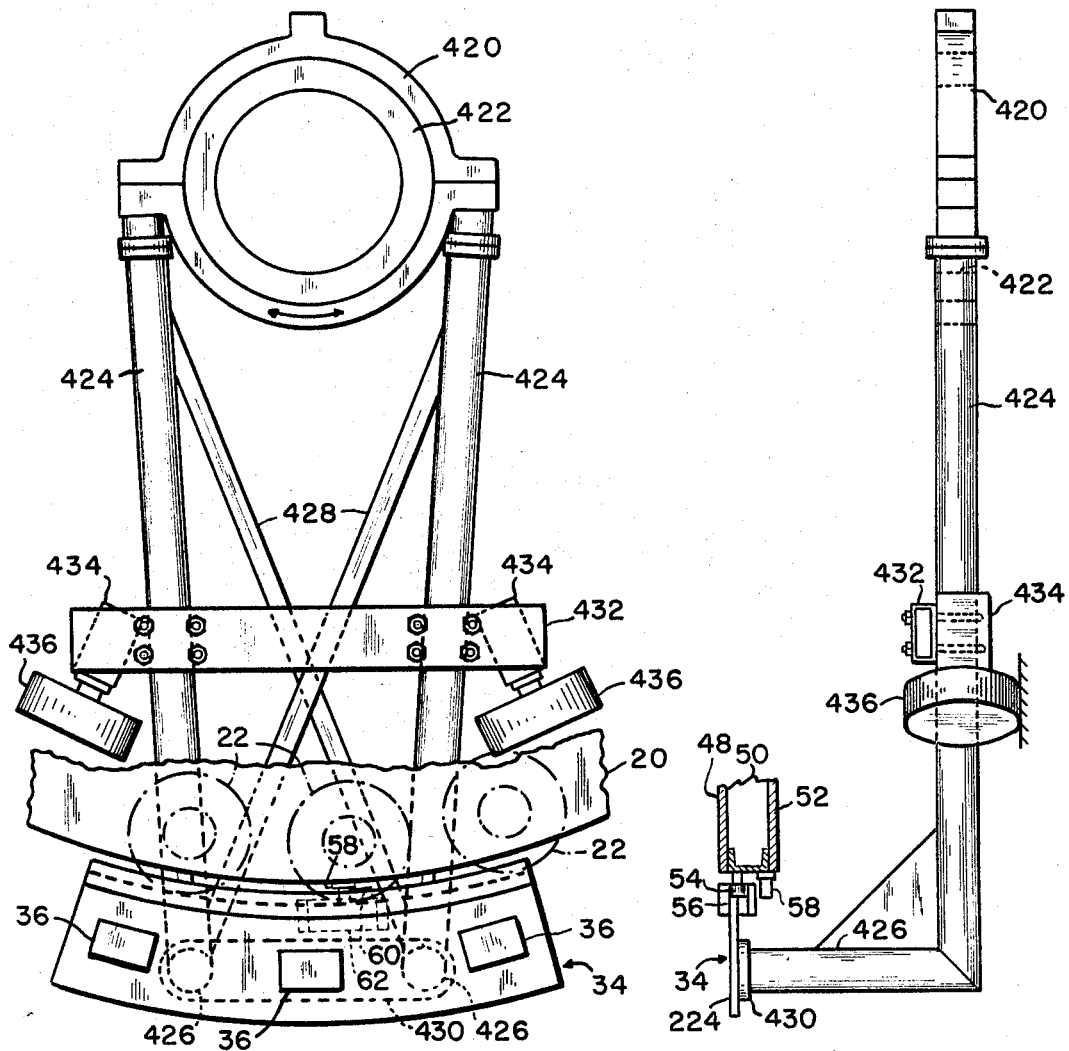

FIGURE 12 is a somewhat schematic plan view of the supporting structure for the movable tool carriage assembly.

FIGURE 13 is a side elevational view of the structure shown in FIGURE 12.

Figure 14:
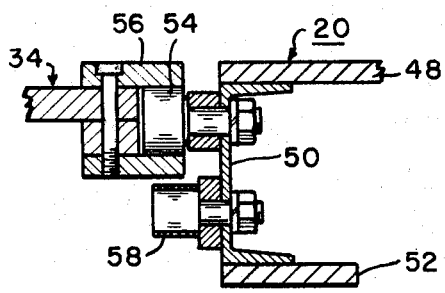

FIGURE 14 is an enlarged elevational view in section of the connection between the movable tool carriage assembly and the rotating conveyor table.

FIGURE 15 is a schematic illustration of the mechanism for imparting movement to the movable tool carriage assembly so as to return the same to an initial pick-up position after movement in unison along a predetermined arc with the rotating conveyor table.

FIGURE 16 is a cross-sectional view in elevation taken along line XVI—XVI of FIGURE 15.

FIGURE 17 is a schematic plan view illustrating the means for imparting rotation to the rotatable spindle assemblies.

Figure 1:
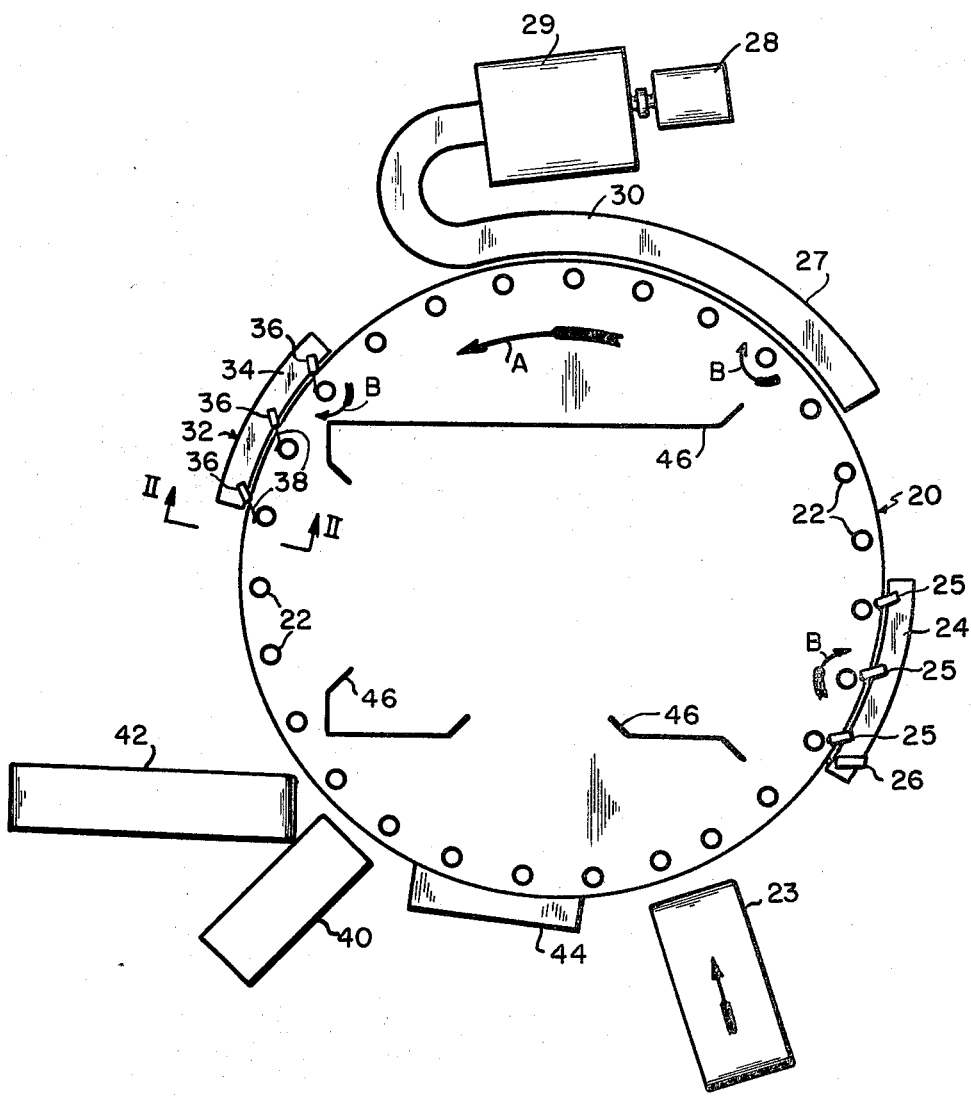
FIGURE 1 is a schematic plan view of apparatus embodying the instant invention illustrating the various loading, operating, and unloading stations about a continuously rotating table conveyor.

Referring now to the drawings, and particularly FIGURE 1, a rotatable table or conveyor, which is continuously rotatable by conventional variable drive means, is shown at 20. As shown by arrow A, the table is illustrated as rotating in a counterclockwise direction. A plurality of ware-retaining rotatable spindle assemblies 22 are schematically shown equally spaced about the periphery of the rotating table 20. As indicated by arrows B, the spindles 22 are rotatably driven about their vertical axis as they proceed through various portions of the circular path in which they are conveyed by rotating table 20.

A loading zone 23 is provided for positioning ware articles to be decorated upon the various spindles 22, and means described hereinafter are provided for retaining each article on its respective spindle. As the ware articles, positioned upon the spindles 22, proceed in their travel through a continuous circular path by means of the rotatable table conveyor 20, they initially pass a coating station 24 having a plurality of spray nozzles 25. Each of the nozzle 25 is positioned so as to spray coat a particular portion of the rotating ware article presented thereto, so that the entire bank of nozzles completely covers the desired surface of the ware articles. The spray nozzles 25 may be any suitable industrial pneumatic spray device, such as Binks Spray Guns model number 21, and the nozzles are periodically energized upon the presentation of a ware article by suitable timing mechanism or a trip-type limit switch 26, so as to provide a uniform coating throughout the desired extent of each article.

The spray coating media provides a desired color or tone to the surface of the article. Such color media are well-known in the art, and usually are essentially glass frits pigmented with inorganic oxides. An aqueous vehicle, such as a mixture of water and alcohol, is utilized to suspend the media for spraying purposes. The alcohol content of the vehicle not only speeds up the spray and drying rate, but also aids in flocculating the color. The coefficient of expansion of the color media should be correctly matched to the expansion coefficient of the base glass of the article to provide a finished product having proper strength and durability.

The coated articles then proceed along their path of travel to a drying zone 27. In its simplest form, the drying zone comprises a blower 28 for blowing air through a suitable heater 29 and for conveying the heated air along a drying tunnel 30, which is open along an arc adjacent the circular path of travel of the coated ware articles. The ware articles are rotated about the axis of the spindles 22 as they proceed through the drying zone 27, so that all coated sides of the ware are presented to the hot air issuing from the drying tunnel 30 and the coating dried to a soft powdery form.

The ware articles are then conveyed to a cutting removal or tooling station 32 where a predetermined design is mechanically formed in each of the ware articles to provide a textured surface. The cutting or tooling station 32 has a movable tool carriage assembly 34 which periodically engages the rotating table 20 and moves simultaneously therewith through a predetermined arc. At the end of such travel, the carriage assembly 34 disengages from the rotating table 20 and returns to an initial starting position for further periodic engagement. The tool carriage assembly is provided with a plurality of tool assemblies 36, carrying suitable cutting or shearing tools 38, which operatively engage the rotating ware articles to remove portions of the dried coating so as to provide a textured design on such articles. The removal is performed so as to provide sharp or defined edges in the dried coating and in effect forms a series of rectangular or square grooved cross section in the dried coating between its upper surface and the surface to which such coating was applied.

The textured ware articles are then conveyed along conveyor 20 to an unloading zone 40 where the articles are removed from the spindles 22 and preferably transported along a suitable conveyor 42 to a lehr, where the textured coating is fired to maturity so as to provide a durable color finish which is permanent in nature. The maturing point, as known in the industry, is a function of time and temperature and will, of course, vary with the various coloring agents and base glasses utilized. The spindles 22 are not rotated as they pass through the loading and unloading zones so as to facilitate the positioning of the ware articles on and the removal from the ware-retaining rotatable spindle assemblies 22.

The spindle assemblies then proceed through a cleaning zone 44, before completing their cycle and passing on to the loading zone 23. The cleaning zone is provided with brushes and suction to remove any dirt particles or excess dried spray coating from the spindle assemblies and hold-down means so as to prevent a buildup thereof. In addition, a central suction exhaust system 46 not only removes dust and dirt from the cleaning zone 44, but also withdraws excess spray coating from the coating station 24, and dried coating particles from the cutting and tooling station 32.

As will be noted, the continuously rotating conveyor table 20 is provided with 27 separately rotatable ware-retaining spindle assemblies 22 about its periphery. The particular number of spindles utilized is, of course, arbitrary. However, since the table is continuously rotating it is necessary that the number of tool assemblies 36 carried by the movable tool carriage assembly 34 be divisible into the total number of spindles by a whole number, so that the simultaneous movement of the carriage with the table may be programmed to insure that each article retained on a ware spindle is acted upon.

Figure 2:
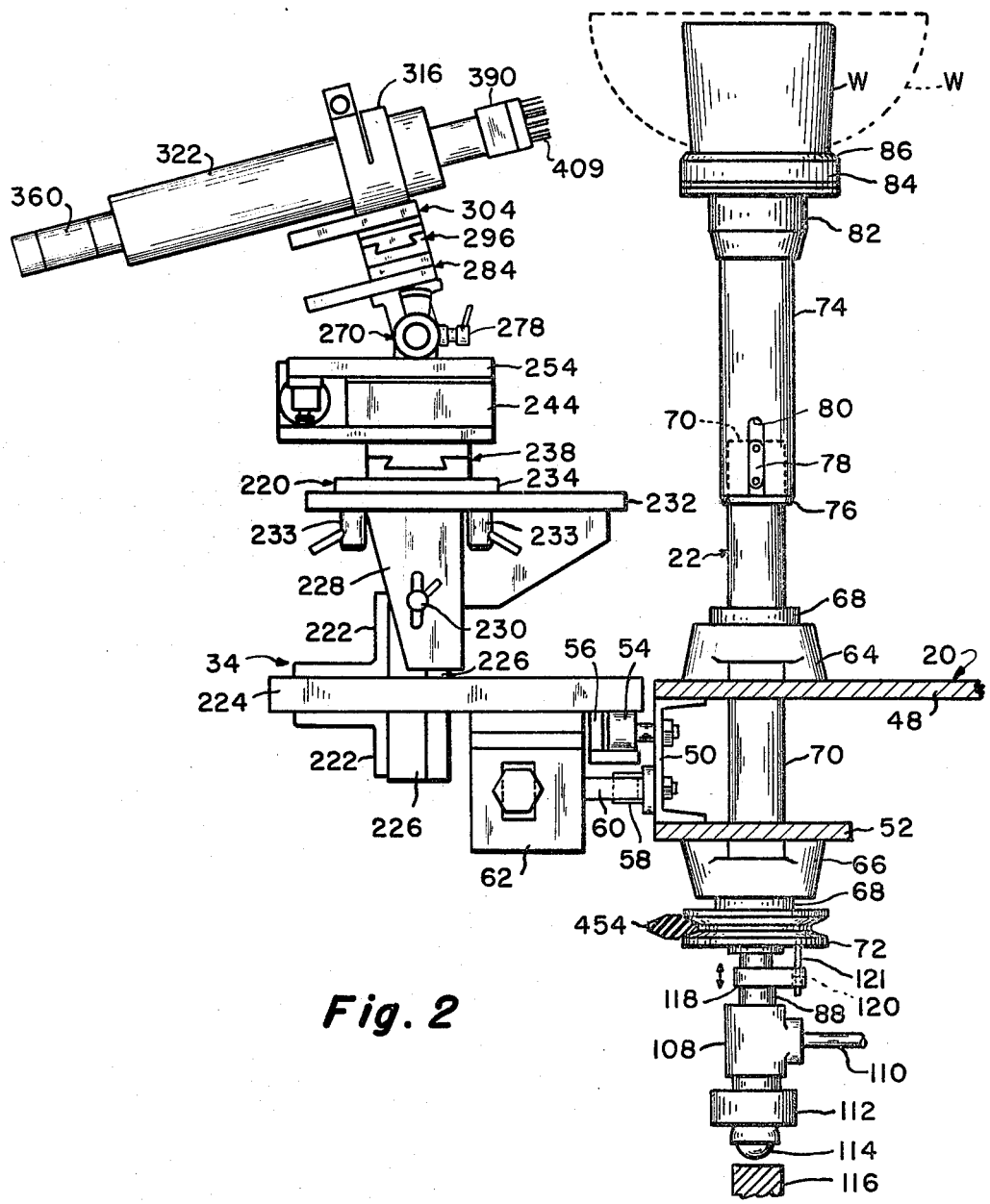
FIGURE 2 is a side elevational view of a portion of the apparatus embodying the invention which would be seen when looking along line II—II of FIGURE 1, and illustrating a rotatable ware-retaining spindle in a position along side of the removal or tooling station, with the cutting tool in its retracted or inoperative position on a movable tool carriage assembly.

Referring now to FIGURE 2, a rotatable spindle assembly 22 is shown mounted on a peripheral edge of the rotating table conveyor 20 adjacent the movable tool carriage assembly 34, which is shown without its supporting structure. As also shown in FIGURES 13 and 14, the rotating table 20 has an upper plate 48, a peripheral channel beam 50, and a lower plate 52. The channel beam is provided with a roller 54 which is received within a guide channel 56 of movable tool carriage assembly 34. In addition, the beam 50 has a plurality of pins 58 projecting outwardly therefrom. A pneumatically operated latch or finger 60, which slides outwardly and inwardly of an air cylinder 62, engages and disengages pins 58 so as to move carriage 34 through a predetermined arc simultaneously as a unit with table 20.

A pair of axially aligned pillow blocks or bearing housings 64 and 66 are respectively secured to upper plate 48 and lower plate 52 of the rotating table 20. Each of said housings has an outwardly projecting clamp or locking collar 68. The spindle assembly 22 has stem or tubular portion 70 which is journaled for rotation about its vertical axis within bearing housings 64 and 66.

The tubular portion 70 is fixed longitudinally within pillow blocks 64 and 66 by clamp or locking collars 68, so that all of the spindles may be provided with a uniform fixed or predetermined height about the rotating table 20 with respect to a common reference. A chuck stem 74 is positioned over the upper extent of tubular portion 70 and is retained in position thereon by a clamp or retainer ring 76. A longitudinal key 78 is secured to the tubular portion 70 and is received within a longitudinal slot 80 formed in the chuck stem 74, so that the stems 70 and 74 will rotate in unison.

Figure 3:
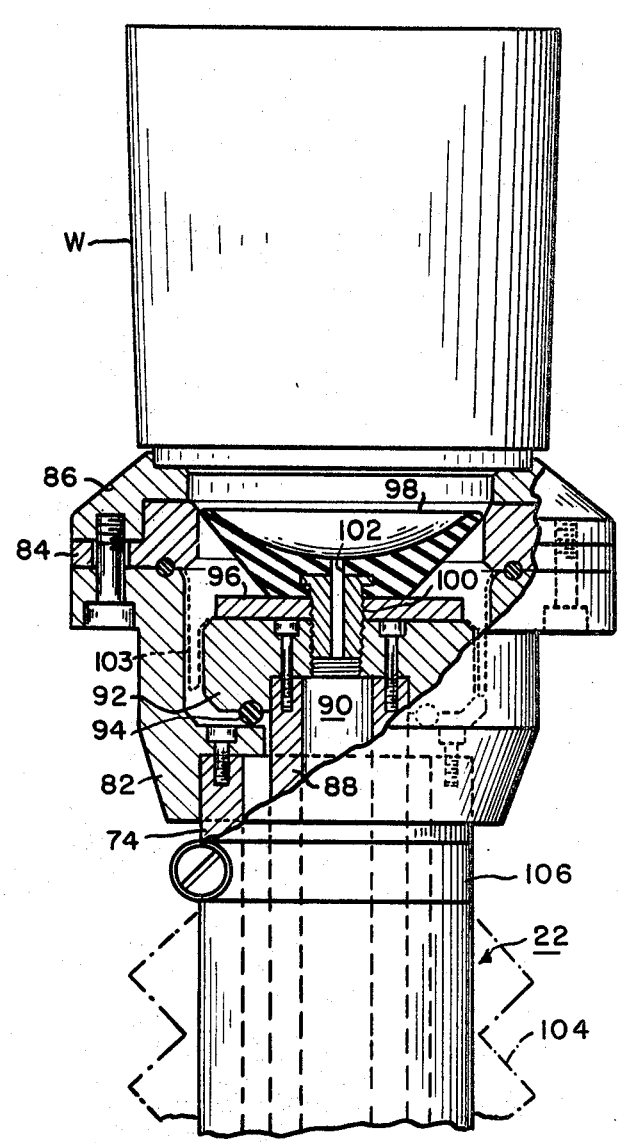
FIGURE 3 is a partially cut-away fragmental view of the upper vacuum head portion of the spindle assembly shown in FIGURE 2, showing a cylindrical mug-like article retained thereby.

As also shown in FIGURE 3, a chuck hub 82 is secured to the upper end of the chuck stem 74. A chuck adapter disc 84 is secured to the chuck hub 82, and a chuck 86 is securely located on the adapter disc 84. A hollow spindle shaft 88, having a central bore or passageway 90, is mounted for sliding movement within both stems 70 and 74. A limiting collar 92 is secured to the upper end of the shaft 88, and limits the downward longitudinal movement of shaft 88 by engaging an internal flange of the chuck hub 82, which engagement may be cushioned by means of an O ring 94.

An upwardly open suction cup 98, having a clamping plate 96, is threadably secured to collar 92 by an integral adapter 100. The adapter 100 has a bore 102 communicating between the open face of the suction cup 98 and the passageway 90 of hollow spindle shaft 88. A rubber boot 103 is secured between the hub 82 and the collar 92 to prevent dust and other foreign material from entering the working mechanism of the spindle assembly 22. If desired, a suitable protector bellows 104 may be clamped over the stems 70 and 74 by means of suitable clamping rings 106. As shown, a ware article W, such as a mug or bowl, is positioned upon and retained by the chuck 86.

Referring now to FIGURE 2, the lower end of the hollow spindle shaft 88 is provided with a rotatable union 108 having an inlet 110 connected to a suitable source of controlled atmosphere and communicating with passage 90. The outer housing of the union 108 is restrained from rotation, whereas the inner passage means thereof is free to rotate with the spindle 88. A weighted ball caster 112 is secured to the lower end of spindle 88 and carries a freely rotatable ball 114 which engages a cam track 116, extending in an arc concentric with the axis of rotation of the rotatable table 20. A torque arm 118 is affixed to the spindle 88 above the union 108, and has a guide hole 120 which receives a pin 121 mounted on pulley 72, which in turn is secured to sleeve 70. A double sided V belt 454 engages the pulley 72 to impart rotation thereto.

In operation, the belt 454 rotatably drives pulley 72 so as to rotate stem 70 which, through key 78 and slot 80, imparts rotation to the sleeve 74. In a like manner, the pin 121 drives torque arm 118 to rotate the spindle 88 in unison with the sleeves 70 and 74.

The spindle 88 is cammed upwardly from the down position shown in FIGURES 2 and 3 and moves collar 92 and plate 96 upwardly, so that suction cup 98 engages the bottom of the ware article W. A vacuum is applied to inlet 110 of the union 108 and communicates with the open mouth portion of the suction cup 98 through bore 102 and passageway 90. After an initial vacuum connection is made between the suction cup 98 and the ware article W, the cam track 116 drops downwardly so that the weight of the hollow spindle shaft 88 and its component parts is suspended by the suction cup, and thereby retains the ware article W in position on the chuck 86. When it is desired to release the vacuum, positive pressure is applied to inlet 110, which releases the suction cup from the ware article allowing it to fall downwardly along with the collar 92 to its downward most limiting position in engagement with the internal flange of chuck hub 82.

Figure 4:
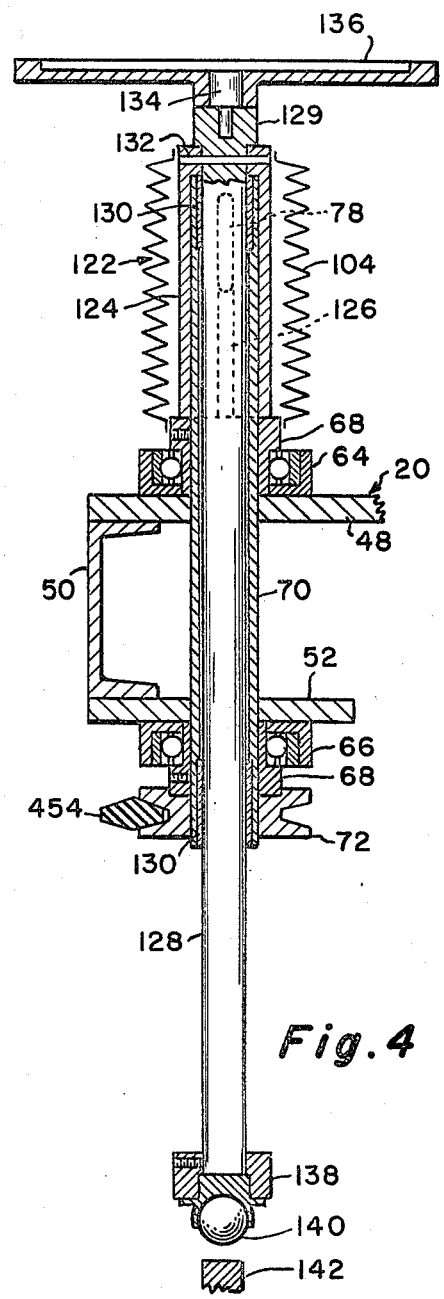

Referring now to FIGURE 4, a further embodiment is shown of a spindle assembly 122 utilized for retaining plates and the like. The modified spindle assembly 122 is similar to assembly 22 in that a stem or tubular portion 70 is rotatably positioned in pillow blocks 64 and 66. Although the tube or stem 70 is journaled for rotation, it is retained in a longitudinal stationary positionment by means of the clamping or locking collars 68. Further, a longitudinal key 78 is secured adjacent the upper end of the tube 70, and pulley 72 is secured adjacent the lower end thereof for engagement with belt 454.

A drive sleeve 124 having a longitudinal slot 126 is slideably mounted on the upper end of tube 70, and when in its lowermost position rests upon the upper clamping collar 68. The slot 126 slideably receives the longitudinal key 78, so that the drive sleeve 124 will rotate in unison with the tube 70, as it in turn is rotated by the pulley 72 and belt 454. A spindle 128 is slideably mounted within tube 70 by means of bearings 130, and is secured to the drive sleeve 124 by a roll pin 132, so that the shaft 128, tubular portion 70, and drive sleeve 124 will all rotate in unison. The upper end of spindle 128 has an expanded portion 129 which receives a connector pin 134 for mounting a ware chuck 136, by means of a square-hole bushing. The lower end of shaft 128 has a caster mounting 138 provided with a ball 140 which rides on an arcuate cam track 142.

In operation, a ware article such as a plate is positioned upon chuck 136, and as the rotating table 20 conveys the spindle assembly 122 through various portions of the operating cycle, the ball 140 rides upwardly on cam track 142 to slide spindle 128 upwardly within tube 70. As spindle 128 moves upwardly, pin 132 carries drive sleeve 124 upwardly on tube 70, and key 78 in slot 126 maintains sleeve 124 and tube 70 rotating in unison. As the spindle 128 is cammed upwardly, a ware article retained by chuck 136 engages a mask assembly to retain the ware article in position on the chuck in manner to be described hereinafter.

Referring now to FIGURE 4a, an upper spindle or hold-down mask assembly is shown at 170, which is cooperable with the modified spindle assembly 122 shown in FIGURE 4. The hold-down mask assembly 170 is suspended from a raised or elevated annular plate 172, and secured to the conveyor 20 by means of a plurality of support rods 174 which are secured to the upper plate 48 of the rotating table. A bearing housing 176, containing bearings 178, is secured to plate 172 and provided with a leveling screw 180. A tubular sleeve 182 is rotatably and slideably positioned within bearing housing 176. A collar member 184 is retained on the lower end of the tubular sleeve 182 by means of a threaded flanged member 186, and removably retains a mask 188 which is adapted to overlay and shield certain portions of a ware article being decorated, such as a plate P.

The upper end of the tubular sleeve 182 is provided with a pulley 190 retained in place by a key 192 and setscrew 194. The pulley 190 is engaged by a rotating belt 196, as the spindle assembly passes through the cleaning zone so as to rotate the assembly and facilitate the cleaning thereof. A wear washer 198 is positioned upon the annular plate 172 about sleeve 182, and provides a bearing surface for the bottom of the pulley 190 when the sleeve is in its lowermost position. A locking or clamping collar 200 is secured about the upper end of sleeve 182 to lock the pulley 190 in position and prevent it from sliding upwardly off of the sleeve 182. A guide pin or dowel 202 is frictionally retained by the collar 200 and projects upwardly within a passage 204 formed through a weight 206 which is removably secured to a shaft 208 slideably retained within sleeve 182. A retainer plate 210 is secured to the lower end of shaft 208 by means of a ball joint 212, and retains a weighted pad 214 which rests upon a center portion of a ware article retained by the lower spindle assembly 122.

It thus can be seen, that through the action of weight 206, the shaft 208 may move longitudinally within and independently of sleeve 182, but due to the action of pin 202, both the shaft and the sleeve must rotate in unison. When the assembly 170 is in its idle or inoperative position, the pulley 190 rests upon the wear washer 198, and the weight 206 rests upon the locking collar 200.

In operation, when modified ware-retaining spindle assembly 122 passes through the spraying zone or coating station, the assembly is cammed upwardly by means of cam track 142 so that the ware article initially engages the weighted pad 214 and raises the same upwardly so that weight 206 is lifted off of collar 200. The ware-retaining assembly 122 is further cammed upwardly so that edge portions of the ware article P engage the mask 188, thereby lifting the pulley 190 off of the wear washer 198. Due to the rotation imparted to the ware-retaining spindle assembly 122 by its pulley 72, the entire unit, including the lower spindle assembly 122 and the upper spindle assembly 170, is rotated about a common vertical axis.

The spray nozzles 25 then apply a coating to the edge portions of the rotating plate P, with the mask 188 protecting center portions thereof, and the weighted pad 214 retaining the plate on the lower spindle assembly.

When the spindle assemblies 122 continue onto the drying zone, the assemblies are cammed downwardly so as to disengage the mask and weighted pad from the plate P and permit the drying of the coating applied to the edge portions thereof. The rate of rotation of the lower spindle assembly 122 during this portion of the cycle is at a reduced or idler speed so that it is not necessary to physically clamp the plate to the supporting ware chuck 136 of the lower spindle assembly 122. When the lower spindle assemblies arrive at the cutting or tooling station, they are again cammed upwardly so that the center portion of the plate P engages and lifts the weighted pad 214, however they are not elevated to such an extent to engage the mask 188. It is thus possible to apply the cutting or shearing tools to the dried coating while retaining the plates in position on the support 136 by means of the weighted pad 214 as the upper and lower spindle assemblies are rotated in unison through pulley 72 of the lower ware-retaining spindle assembly 122.

Figure 6:
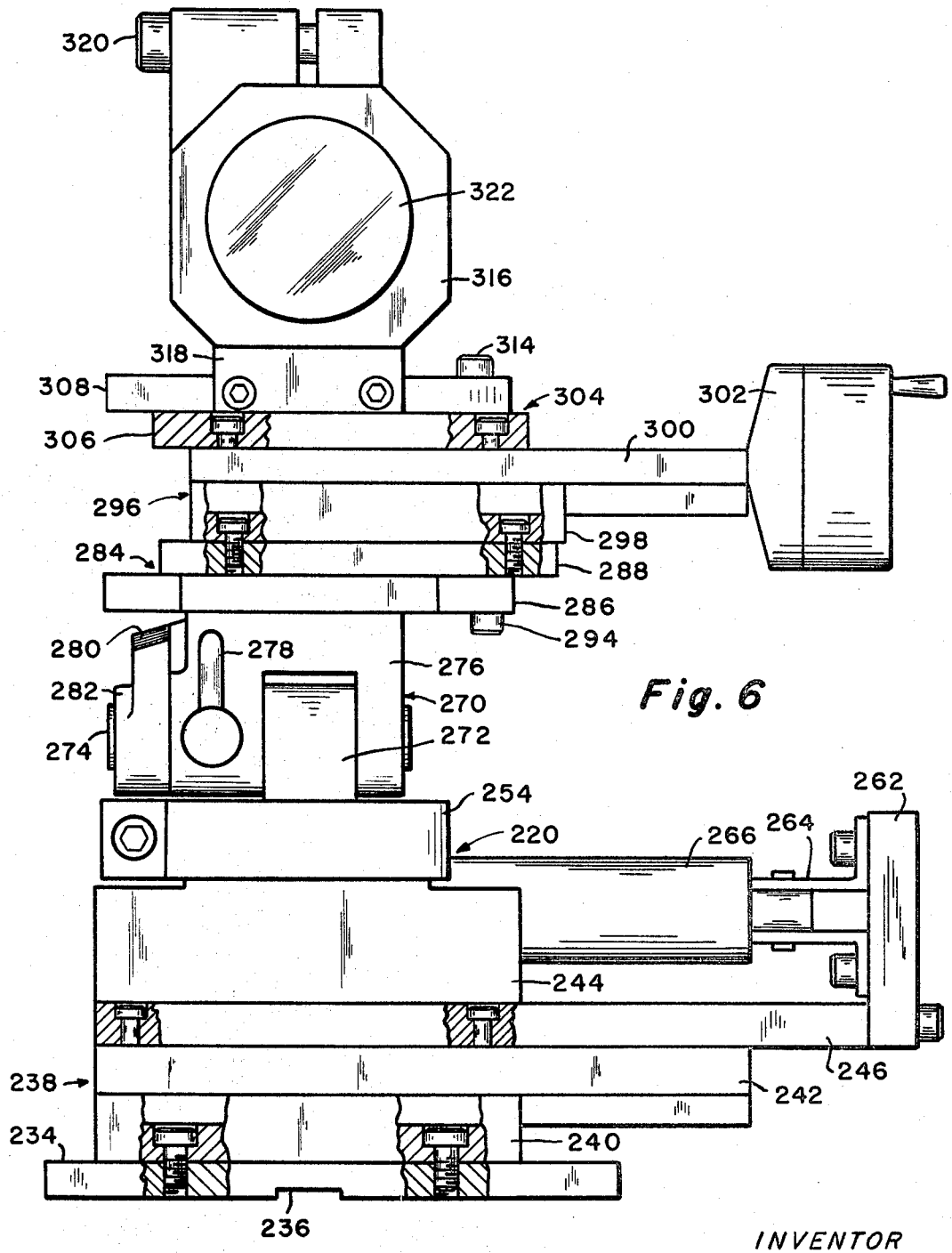
FIGURE 6 is a front elevational view, partially cut-away, of the adjustable tool pedestal assembly shown in FIGURE 5.

An adjustable tool pedestal assembly 220, which is mounted upon the movable tool carriage assembly 34, is shown generally in FIGURE 2 and more specifically in FIGURES 5 and 6. A pair of L-shaped brackets 222, secured to an upper plate 224 of the movable tool carriage assembly 34, support grooved vertical plate means 226 which cooperably slideably receive vertical-oriented support plate means 228. The support plate means 228 may be locked in predetermined vertical positionment upon vertical plate means 226 by means of suitable locking means 230. A ribbed horizontal support plate 232 is secured to the upper end of said vertical-oriented support plate means 228. A recessed plate 234 (see also FIGURES 5 and 6) having a guide recess portion 236, to cooperably slideably receive the rib of support plate 232, is mounted on support plate 232 for sliding movement toward and away from the rotating table substantially along a line extending radially from the axis of rotation of the table. A pair of pivot lock nuts 233 are secured to plate 232 and lockably position plate 234 in a desired orientation thereon.

A dovetailed cross-slide assembly 238 has a lower dovetail recess block member 240 secured to the upper surface of plate 234, and an upper dovetailed block 242 slideably mounted on lower block 240 in a direction substantially perpendicular to a line extending radially from the axis of the rotating table 20, to position the operating tool and compensate for different sizes and shapes of ware to be acted upon.

A bearing housing 244 is secured to the upper block 242 by means of a support plate 246 which is bolted to both the housing 244 and the block 242. The housing 244 has a vertically-extending bore 248 provided with a pivot shaft 250 journaled for rotation in a pair of tapered roller bearings 252. A lock nut and washer 253 is secured to a threaded lower end of shaft 250 to retain the lowermost roller bearing 252 in position. A pivotal cap 254, overlying the bearing housing 244 and having an extension arm 256, is connected to the upper end of the pivot shaft 250 by a roll pin 258 so as to rotate in unison with the pivot shaft. An oil seal 260 is provided within the bore 248 adjacent the upper end thereof.

An upright backup plate 262, secured to support plate 246, is provided with a bracket 264 which is pivotally connected to the rearward end of an air cylinder 266. The operating rod or piston of such air cylinder is connected to extension arm 256 by means of a pivotal connection 268. It is thus possible, by controlling the supply of air from a suitable source to the cylinder 266, to pivot the tool pedestal assembly about the vertical axis of pivot shaft 250 so as to adjust the angle of presentation of the cutting or shearing tools to the ware article.

A horizontal pivot assembly 270 has a stationary shaft-retaining block 272 secured to the pivotal cap 254. The block 272 carries a shaft 274 about which a yoke or tilt head 276 pivots. A handled pivot lock nut 278 locks the tilt head 276 in a desired position upon the shaft 274. A scale 280 on a face member 282 indicates the degree of tilt applied to the upper tool pedestal assembly by means of the horizontal pivot assembly 270. The horizontal pivot adjustment is necessary to insure uniform presentation of the longitudinal extent of the cutting and shearing tool to the ware article.

A first pivot plate assembly 284 has a bottom plate 286 secured to the top of yoke 276, and a top plate 288 pivotally mounted thereon by the means of a pivot pin 290, having retainer rings 292 adjacent each end. A cap screw 294 (FIGURE 6) locks the relative pivotal position of plate 288 with respect to stationary plate 286.

A second dovetail slide assembly 296 has a recessed bottom plate 298 secured to the pivotal top plate 288 of the first pivot plate assembly 284. A dovetailed top plate 300 is slideably mounted on the bottom plate 298, and a hand operated crank 302 is provided to finely adjust the relative positionment of top plate 300 on bottom plate 298, so as to provide an adjustment which will compensate for wear on the operating end of the abrading or cutting tool carried by the pedestal assembly.

A second pivot plate assembly 34 has a stationary bottom plate 306 secured to the top plate 300 of the second dovetail slide assembly 296. A pivotal top plate 308 is pivotally mounted on the bottom plate 306 by means of a pivot shaft 310, maintained in position by end retaining rings 312. Suitable locking means, such as a cap screw 314 (FIGURE 5) is utilized to lock the relative pivotal positionment between the pivotal top plate 308 and the stationary bottom plate 306. A split ring turret mounting yoke member 316 is secured to pivotal top plate 308 by means of a mounting bracket portion 318 and has adjustable screw means 320 for clamping and lockably retaining a tool holder turret assembly 322.

Referring now to FIGURES 7 through 10, a tool holder turret assembly 322 is shown having a hollow turret housing 324 with a cylinder or guide housing 326 secured in axial alignment to the rearward end of the turret housing. A tool holder barrel or sleeve 328, having a turret head assembly 330 secured to the end thereof, is slidably and rotatably mounted within the bore 325 of the turret housing 324. The housing 324 is provided with an L-shaped slot 332 (see also FIGURE 8a) which extends transversely across the housing and has an upwardly open portion 334. A wear plate 336, having a complementary L-shaped slot 338, is secured to each side of the turret housing 324 so that the L-shaped slots are in alignment.

Figure 8:
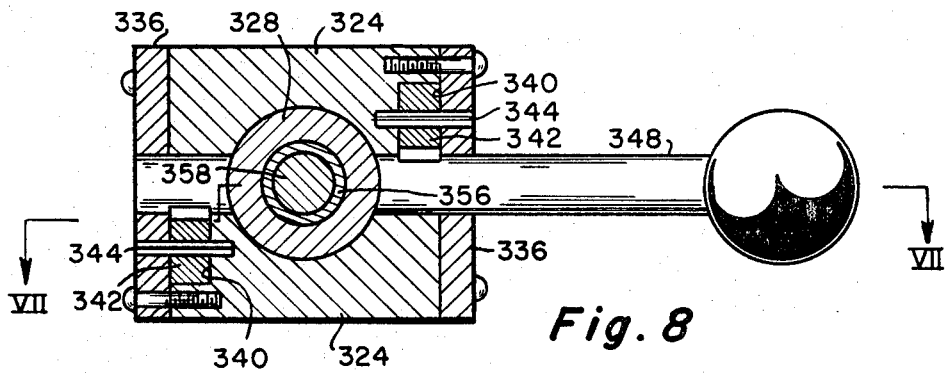
FIGURE 8 is a cross-sectional view in elevation taken along line VIII—VIII of FIGURE 7.
Figure 8A:
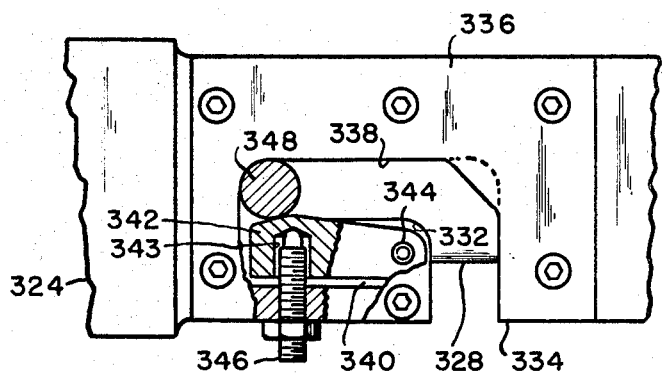
FIGURE 8a is a fragmental cut-away view of the right side of FIGURE 8.
Figures 9, 10:
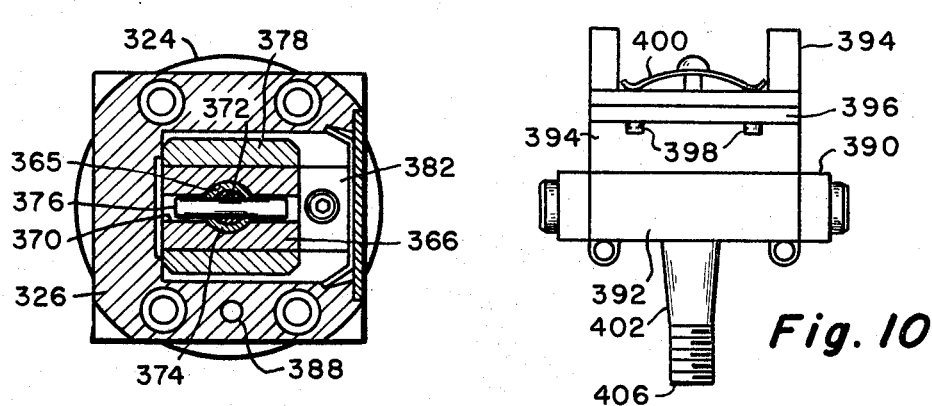
FIGURE 9 is a cross-sectional view in elevation taken along line IX—IX of FIGURE 7.
FIGURE 10 is an end view of a tool mounting assembly shown in FIGURE 7.

A recess 340 is formed in each side of the turret housing 324 adjacent the L-shaped slots 332, and as shown particularly in FIGURES 8 and 8a, receives a locking cam 342 pivotally mounted to the wear plates 336 by means of a roll pin 344. A spring tensioned plunger 346 extends through an upper surface of housing 324 and into a recessed portion 343 of each locking cam 342 to urge such cam downwardly. An operating handle 348 extends through the L-shaped slots 332 and 338 and engages the tool holder barrel or sleeve 328 so as to rotate such barrel through an arc of substantially 180° by means of the L-shaped slots, and lockably retain such barrel in position throgh a longitudinal sliding movement under the spring tensioned locking cams 342 which engage the handle 348.

A split clamping ring 350 is formed in the forward upper half of the turret housing 324, and has a pair of aligned openings adjacent the top thereof on opposite sides of a longitudinal slot. A threaded tightening lever 352 cooperably engages such aligned openings to tighten the split ring 350 about the positioned tool holder barrel or sleeve 328 and securely clamp it in such desired position. A sealing or wiping ring 354 is positioned within a recessed portion of the bore 325 to prevent foreign matter from entering the bore during the sliding movement of the sleeve 328. A pair of cylindrical bearings 356 are positioned within recesses formed in each end of a bore 329 extending through the sleeve 328, and slidably receive and guide a tool push rod 358 which extends outwardly beyond both ends of the sleeve 328.

For reasons which will become more apparent hereinafter, it is desirable that the longitudinal motion imparted to the tool push rod 358 be in the nature of an impact quick-acting movement or snap action, and such movement is achieved by means of the operating mechanism retained in cylinder or guide housing 326, and its associated air cylinder 360. The cylinder 360 is threadably secured at 362 to a rearward end of the housing 326, and is locked in position by a setscrew 364. A reduced rearward portion of the push rod 358 projects into the guide housing 326 and into a longitudinal bore 365 of a hollow guide coupling 366. A dowel pin 368 passes through aligned openings in the rod and coupling so as to securely fasten the two together. The coupling 366 is provided with a longitudinal slot 370 which extends vertically therethrough. The air cylinder 360 is provided with a piston rod 372 having a cylindrical adapter 374 to cooperably slide within the bore 365 of the guide coupling 366. A vertically projecting pin 376 extends through aligned openings in the adapter and piston rod to secure the two together, and further projects into longitudinal slots 370 of the guide coupling 366, providing a sliding lost-motion connection therewith.

A pair of anti-torque coupling plates 378 are retained within the guide housing 326 on opposite sides of the guide coupling 366 by means of a plurality of adjustment screws 380. The plates 378 guide the longitudinal sliding movement of the guide coupling 366, while preventing the rotatable sleeve 328 from imparting a torsional movement to the push rod 358.

A pair of stroke-control spacer blocks 382 are positioned within the housing 326 to limit the forward and rearward movement of the guide coupling 366. A bearing 384, held in position by a retainer ring 386, is positioned adjacent the forward end of the housing 326 to facilitate the sliding movement of the push rod 358. A vent passage 388 extends through the housing 326 so as to vent the bore 325 of the turret housing 324 rearwardly of the tool holder barrel or sleeve 328, so as to facilitate its rearward movement within such bore.

Figure 7:
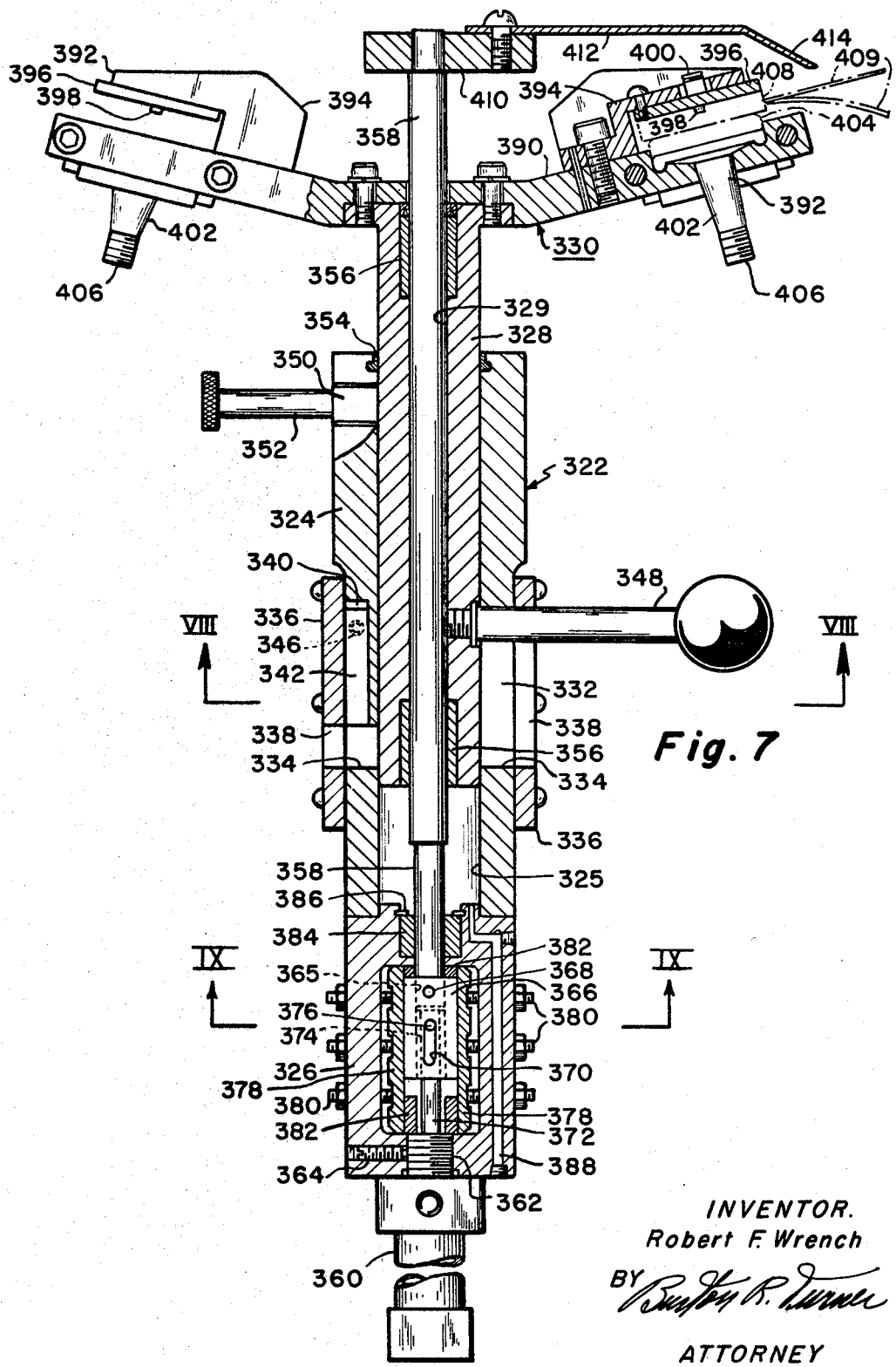
FIGURE 7 is a plan view partially in section of a tool holder turret assembly, with the section taken along line VII—VII of FIGURE 8.

In operation, with the piston rod 372, guide coupling 366, and push rod 358 in their extended or most forward position as shown in FIGURE 7, the cylinder 360 is actuated to retract the piston rod 372. Accordingly, the rod begins its rearward travel picking up momentum in its progress. At is travels rearwardly the pin 376 slides backwardly in the slot 370 until it hits the rearward end of such slot providing an impact or snap action movement to the push rod 358 through the guide coupling 366. In a like manner, when it is again desired to impart forward movement to the push rod 358, the cylinder 360 is actuated to move piston rod 372 forwardly. The rod picks up momentum as pin 376 slides forwardly in slot 370 until it hits the forward end thereof and causes an impact or snap action forward movement to be supplied to push rod 358 through the guide coupling 366.

Referring now to the turret head assembly 330, secured to the outer end of the holder barrel or sleeve 328, the assembly includes a cross-bar turret head 390 having identical tool mounting assemblies 392 adjacent each end. Each tool mounting assembly has an offset anvil member 394 secured to the cross-bar turret head 390 and retains a tool jig plate 396 in spaced relation from the turret head 390. A pair of tool aligning pins 398 extend through the jig plate 396 and are spring tensioned downwardly by a spring bar 400 retained on the anvil member 394. An inflatable or rubber chuck 402 extends through an opening in the turret head 390 and has an inflatable diaphragm member 404 supplied with air pressure through tubular inlet 406 to maintain a tool 408 in aligned position with the pins 398 and jig plate 396.

The tool push rod 358 is supplied at its outer end with a tool push rod clamp 410 having an angular depresser member 412 for engaging the cutting elements 409 of the tool 408 and deflecting them in an inoperative position. When the cylinder 360 is actuated to retract the depresser member 412 from its shown extended position, through the previously described snap action, the angular portion 414 of the depresser member 412 engages the cutting elements 409 and flexes them rearwardly to the curved position shown in FIGURE 7.

Referring now to FIGURES 11a through 11c, a somewhat schematic representation is shown of the step-wise process involved in presenting tool elements 409 to a ware article W, rotated about a vertical axis upon spindle 22. As shown, the air cylinder 266, pivotally mounted at its rearward end to backup plate 262, is energized so that its piston rod 267, pivotally connected to the adjustable tool pedestal assembly 220, rotates the tool holder turret assembly 322 about a vertical axis so as to present the cutting elements 409 of tool 408 adjacent the surface of the rotating ware article W. The depresser member 412 deflects the cutting elements 409 inwardly away from the ware article W as shown in FIGURE 11b.

The air cylinder 360 is then energized to provide the desired snap-action forward movement to push rod 358 so as to substantially instantaneously supply the cutting elements 409 to the surface of the ware W (see FIGURE 11c), in a quick-acting motion. The snap action of the cutting elements is necessary to provide a smooth even cut on the surface of the ware and insure tracking of the element as the ware rotates. As shown in the drawings, the ware is rotated in a direction counter-current to the outward extent of the cutting elements 409. In a like manner, when the tool cutting elements 409 are to be removed from the surface of the ware article W, the cylinder 360 is actuated in reverse so as to provide a snap action to the rod 358 and depresser member 412 so as to substantially instantaneously remove the elements from the ware with a clean break.

The cylinder 266 may also be actuated in reverse to pivot the tool holder turret assembly 322 about a vertical axis of the tool pedestal assembly 220 into its inoperative position as shown in FIGURE 11a. When in such position, the split clamping ring 350 may be loosened by lever 352 (see FIGURE 7) and operating handle 348 actuated to rotate tool holder barrel 328 through 180° to thus pivot the turret head assembly 330 and position a reserve or idle tool 408, held in the outer tool mounting assembly 392, over into the active tool position. The used tool may then be removed from the tool mounting assembly by releasing the pressure in the inflatable rubber chuck 402, and a replacement tool positioned therewithin by means of alignment pin 398 and tool jig plate 396. Air pressure is then applied to inlet 406 so as to inflate the diaphragm member 404 and retain the replacement tool in position within the tool mounting assembly 392. It thus can be seen, that with this novel tool holder turret assembly, it is possible to change the cutting tools on-the-fly without necessitating downtime of the machine.

A supporting structure for the movable tool carriage assembly 34 is shown in FIGURE 12 to 14 inclusive. A split bearing 420, mounted for rotation through a predetermined arc, is positioned about a bearing stand 422, which is concentric with the axis of rotation of rotating table 20. A pair of tubular support elements 424 are rigidly secured at one end to opposite sides of the split bearing 420. At their opposite ends, the support elements 424 are secured to upright tubular supports 426, which at their upper ends are secured to upper plate 224 of the movable tool carriage assembly 34. At pair of cross braces 428 provide added structural rigidity to the support members 424, and a tie bar 430 maintains the upright supports 426 in spaced relation.

A channel member 432 is securely fastened to tubular support elements 424, and has a pair of wheel mountings 434 rotatably supporting a pair of pneumatic tires 436, which are positioned to rotate in an arc concentric with the axis of rotation of the rotating table 20. In effect, the pneumatic tires 436 help to support a portion of the weight of the carriage assembly 34, and thereby reduce the overhung weight of such supporting structure, which would otherwise be imparted to the table 20 through the roller support followers 54 and guide channel 56. The roller followers 54, retained about the periphery of the table 20 by channel 50, ride within the guide channel 56 so as to reference the movable tool carriage assembly 34 and the rotating conveyor table 20 with respect to a common horizontal plane.

Referring now to the schematic illustration of FIGURES 15 and 16, the mechanism is shown for returning the tool carriage assembly 34 to its initial pickup position after completing its arcuate travel in unison with the table 20. A rudder 438 is secured to the tubular support elements 424. A pair of spaced-apart idler pulleys 440 have a cable 442 positioned there around with the opposite ends clamped or secured to the rudder 438. A second pair of pulleys 444 also have a cable 446 positioned thereover whose ends are secured to the opposite sides of a piston 448 positioned within an air cylinder 450. A connector 452 rigidly secures cable 442 to cable 446.

In operation, with the carriage 34 in its initial pickup or idler position, cylinder 62 is activated to extend the finger or pickup latch 60 so as to engage a pin 58 on continuously rotatable table 20. If desired, suitable cushioning means may be utilized to absorb the initial impact imparted to the carriage assembly by the pin 58 of the continuously rotatable table 20. As the carriage 34 proceeds through a predetermined arc in unison with the table 20, the rudder-cable return system freely rotates with the carriage and table. When travel through the predetermined arc is completed, the cylinder 62 is activated to retract finger 60 and air is supplied to inlet 451 of cylinder 450 to retract piston 448, and thus move cables 446 and 442 in the direction shown by the arrows so as to return rudder 428 and carriage assembly 34 in a clockwise direction to their initial starting positions.

Referring now to FIGURE 17, a belt drive assembly is shown for imparting rotation to the various spindle assemblies. As shown a double sided V belt 454 is positioned in a closed path about a plurality of idler pulleys 456 and a drive pulley 458. The belt engages the pulleys 72 of the various spindle assemblies to impart rotation thereto as they are conveyed through predetermined arcs by the continuously rotating conveyor 20. Such rotation is imparted to the various spindles at the coating station, drying zone, cutting or tooling station, and the cleaning zone. The speed of rotation imparted by the drive pulley 458 may be adjusted as desired, and the zone encompassed by the belt is determined by the positionment of the idler pulleys 456 about the desired peripheral arc of the table 20. A similar drive belt system is utilized to drive pulleys 190 of the upper spindle assemblies 170, as they are conveyed through the cleaning zone.

Although I have disclosed the now preferred embodiment of the invention, it will be apparent to those skilled in the art that various changes and modifications may be made thereto without departing from the spirit and scope thereof as defined in the appended claims.

I claim:

1. Apparatus for decorating tableware and the like which comprises, means for conveying ware articles along an arcuate path, means adjacent said path for applying a coating to desired surface areas of ware articles conveyed therealong, means for drying such coating as the ware articles proceed along the arcuate path by said conveyor means, means movable in unison with said conveyor means along a predetemined portion of said arcuate path for selectively removing portions of the dried coating on the ware articles to provide a textured surface decoration thereon, said means for conveying ware articles along an arcuate path comprising a continuously rotatable table having a plurality of spindle assemblies positioned adjacent the periphery thereof, means for rotating each of said spindle assemblies about a vertical axis, chuck means on said spindle assemblies engaging an under surface of a ware article for supporting the same thereon, and means cooperably engageable with an upper surface of said ware article as it is conveyed along selective portions of the arcuate path to retain said article on said chuck means.

2. Apparatus for decorating tableware and the like which comprises, rotating table means for conveying ware articles along an arcuate path, means adjacent said path for applying a coating to desired surface areas of ware articles conveyed therealong, means for drying such coating as the ware articles proceed along such path by said rotating table conveyor means, a tool carriage assembly mounted for pivotal movement through a predetermined arc concentric with the axis of rotation of said rotatable table conveyor for movement in unison with said conveyor along a predetermined path for selectively removing portions of the dry coating on the ware articles; and means for returning said removable tool carriage assembly to an initial starting position after completing its travel through the predetermined arc in unison with said conveyor comprising a rudder member secured to a pivotal supporting assembly for said tool carriage assembly and pivotal through an arc concentric with the axis of rotation of the rotatable table, a first cable positioned about a pair of spaced-apart pulleys with its ends secured to said rudder, a second cable positioned about a second pair of spaced-apart pulleys having its ends secured to opposite sides of a piston positioned within a fixedly positioned pressure cylinder, means connecting said first and second cables together, and means for supplying pressure to one end of said cylinder to retract said piston and move said cables about their respective pulleys so as to rotate said rudder and accordingly said tool carriage assembly through arcs concentric with the axis of rotation of said conveyor to an initial starting position.

3. Apparatus for decorating tableware and the like which comprises, means for conveying ware articles along a predetermined path, means adjacent said path for applying a coating to desired surface areas of ware articles conveyed therealong, means for drying such coating as the ware articles proceed along the path, means movable in unison with said conveyor means along a portion of said path for selectively removing portions of the dried coating on the ware articles to provide a textured surface decoration thereon, and said means for selectively removing portions of the dried coating on the ware articles includes a tool pedestal assembly comprising a first pair of dovetailed slide blocks, housing means on said blocks retaining a vertical pivot shaft connected to a pivotal cap for providing pivotal movement about a vertical axis, a shaft-retaining block secured to said pivotal cap retaining a horizontal shaft having a tilt head pivotally mounted thereon for arcuate movement about the longitudinal axis of said horizontal shaft, a first pair of pivot plates connected together by a pivot pin for relative pivotal movement therebetween mounted on said tilt head, a second pair of dovetailed silde blocks positioned on said first pair of pivot plates, a second pair of pivot plates connected together by a pivot pin for relative pivotal movement therebetween mounted on said second pair of dovetailed slide blocks, and a mounting bracket for a tool manipulating means secured to said second pair of pivotal plates.

4. Apparatus for decorating tableware and the like which comprises, means for conveying ware articles along a predetermined path, means adjacent said path for applying a coating to desired surface areas of ware articles conveyed therealong, means for drying such coating as the ware articles proceed along such path by said conveyor means, means movable in unison with said conveyor means along a portion of said path for selectively removing portions of the dried coating on the ware articles to provide a textured surface decoration thereon which comprises, manipulating means for arcuately and longitudinally positioning a plurality of tools removably secured thereto by tool mounting assemblies, each of said tool mounting assemblies comprising an offset anvil member secured to a turret head on said manipulating means, a tool jig plate retained by said anvil member in spaced-apart relationship from said turret head, aligning means associated said jig plate for positioning a tool in said mounting assembly, and inflatable chuck means having a diaphragm member engageable with a tool positioned within the assembly to securely retain the same in its aligned position against said tool jig plate.

5. Apparatus for selectively removing surface portions of rotating ware articles presented thereto to provide a textured surface decoration on such ware articles which comprises, means for conveying ware articles along an arcuate path, means for rotating said articles while moving through portions of said arcuate path, support means mounted for pivotal movement through a predetermined arc concentric with said arcuate path, tool pedestal means mounted on said support means for adjusting the position of a tool holder manipulating means carried thereby with respect to a ware article, a plurality of tool holder means mounted on the arcuately and longitudinally manipulated by said tool holder manipulating means, each said tool holder means releasably retaining a cutting tool, means for quickly presenting the operating end of said cutting tool to the surface of a rotating ware article so as to position the operating end into the direction of rotation of such ware article as said support means moves in unison with the ware article through the predetermined arcuate path; and pressure actuated means for returning said support means to an initial position after completing its travel in unison with said article through the predetermined arc.

6. Appartus as defined in claim 5 including a depresser member carried by said manipulating means, and means for providing said depressor member with a snap action to releasably deflect the operating end of said cutting tool with respect to said ware article for controlled quick presentation to and removal from said ware article.

7. Apparatus for selectively removing surface portions of rotating ware articles presented thereto to provide a textured surface decoration on such ware articles which comprises, support means adjacent said ware articles and referenced with respect thereto, tool pedestal means mounted on said support means for adjusting the position of a tool holder manipulating means carried thereby with respect to a ware article comprising, vertical positioning means for vertically positioning a tool relative to a ware article presented thereto, horizontal positioning means on said vertical positioning means for positioning such too toward and away from a ware article, sliding means on said horizontal positioning means for positioning such tool longitudinally of the ware article, means for pivoting such tool about a vertical axis, means for tilting such tool about a horizontal axis, and means for pivoting such tool about an axis perpendicular to such horizontal axis.

References Cited
UNITED STATES PATENTS

| 1,959,711 | 5/1934 | Flint et al. | 118—319 |
| 2,426,391 | 8/1947 | Emerson | 118—319 X |
| 2,600,846 | 6/1952 | Casler | 118—102 |
| 2,698,453 | 1/1955 | Garrow | 118—261 X |
| 2,723,206 | 11/1955 | Falk | 118—319 X |
| 2,854,923 | 10/1958 | Huck | 118—261 X |
| 2,928,368 | 3/1960 | Picard | 118—102 |
| 3,106,858 | 10/1963 | Ward | 118—102 X |
| 3,113,890 | 12/1963 | Johnson et al. | |
| 3,131,092 | 4/1964 | Coghill | 118—413 |

CHARLES A. WILLMUTH, *Primary Examiner.*

J. P. McINTOSH, *Assistant Examiner.*

UNITED STATES PATENT OFFICE
CERTIFICATE OF CORRECTION

Patent No. 3,390,661                                           July 2, 1968

Robert F. Wrench

It is certified that error appears in the above identified patent and that said Letters Patent are hereby corrected as shown below:

Column 1, line 21, "unbraked" should read -- unbaked --. Column 8, line 27, "34" should read -- 304 --; line 65, "throgh" should read -- through --. Column 9, line 53, "At is" should read -- As it --. Column 11, line 44, "428" should read -- 43 --. Column 13, line 15, "associated said" should read -- associated with said --; line 31, "the" should read -- and --. Column 14, line 18, "too" should read -- tool --.

Signed and sealed this 30th day of December 1969.

(SEAL)
Attest:

Edward M. Fletcher, Jr.                                WILLIAM E. SCHUYLER, J
Attesting Officer                                              Commissioner of Paten